US012602072B2

(12) United States Patent
Austermeier et al.

(10) Patent No.: US 12,602,072 B2
(45) Date of Patent: Apr. 14, 2026

(54) PEDAL EMULATOR FOR A VEHICLE

(71) Applicant: HELLA GmbH & Co. KGaA, Lippstadt (DE)

(72) Inventors: Werner Austermeier, Schloss Holte-Stukenbrock (DE); Kerim Florian Huge, Lippstadt (DE); Andreas Mueller, Bueren ot Siddinghausen (DE); Ralf Ridder, Lippstadt (DE); Claus Viethen, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 87 days.

(21) Appl. No.: 18/618,628

(22) Filed: Mar. 27, 2024

(65) Prior Publication Data

US 2024/0241536 A1     Jul. 18, 2024

Related U.S. Application Data

(63) Continuation of application No. PCT/EP2022/074590, filed on Sep. 5, 2022.

(30) Foreign Application Priority Data

Sep. 27, 2021     (DE) ..................... 10 2021 124 880.9

(51) Int. Cl.
G05G 5/03          (2008.04)
B60T 7/04          (2006.01)
(Continued)

(52) U.S. Cl.
CPC ................ G05G 5/03 (2013.01); B60T 7/042 (2013.01); G05G 5/05 (2013.01); B60T 8/171 (2013.01); B60T 2270/82 (2013.01); G05G 25/00 (2013.01)

(58) Field of Classification Search
CPC ........... G05G 5/03; G05G 5/05; G05G 25/00; G05G 1/44; B60T 7/042; B60T 8/171;
(Continued)

(56) References Cited

U.S. PATENT DOCUMENTS 6,722,225 B1     4/2004   Martinovsky
8,474,348 B1     7/2013   Soltys et al.
(Continued)

FOREIGN PATENT DOCUMENTS

DE             19813845 A1     10/1999
DE          102006053408 A1      5/2008
(Continued)

OTHER PUBLICATIONS

International Search Report dated Dec. 9, 2022 in corresponding application PCT/EP2022/074590.
(Continued)

*Primary Examiner* — Joseph J Dallo
(74) *Attorney, Agent, or Firm* — Muncy, Geissler, Olds & Lowe, P.C.

(57)          ABSTRACT

A pedal emulator for a vehicle, having a rotational axis, a pedal lever that can be rotated about the rotational axis, and a force generation unit for exerting a counterforce on the pedal lever via at least one coupling element of the force generation unit that is mechanically coupled to the pedal lever. The counterforce acting in the opposite direction to an actuation force exerted on the pedal lever. The force generation unit can be designed such that a curve of the counterforce along a pedal path of the pedal lever is in the form of a non-linear curve in a pedal path-counterforce diagram.

16 Claims, 9 Drawing Sheets

(51) Int. Cl.

| | | |
|---|---|---|
| *G05G 5/05* | (2006.01) | |
| *B60T 8/171* | (2006.01) | |
| *G05G 25/00* | (2006.01) | |

(58) Field of Classification Search

CPC ........ B60T 2270/82; B60T 8/409; B60T 7/06; B60T 11/18; B60K 2026/023; B60K 26/021; B60K 26/02

See application file for complete search history.

(56) References Cited

U.S. PATENT DOCUMENTS

| | | | |
|---|---|---|---|
| 9,079,570 B2 | 7/2015 | Sellinger et al. | |
| 10,946,741 B1 * | 3/2021 | Kim | G05G 1/40 |
| 11,169,559 B2 | 11/2021 | Isono | |
| 2002/0088303 A1 | 7/2002 | Hayashihara et al. | |
| 2004/0135432 A1 * | 7/2004 | Reuter | B60T 8/4081 |
| | | | 303/152 |

| | | | | |
|---|---|---|---|---|
| 2018/0037207 A1 * | 2/2018 | Pennala | | B60T 8/4086 |
| 2021/0232172 A1 * | 7/2021 | Isono | | G05G 1/44 |
| 2022/0089135 A1 | 3/2022 | Austermeier et al. | | |

FOREIGN PATENT DOCUMENTS

| | | | | |
|---|---|---|---|---|
| DE | 102010034696 A1 | | 2/2012 | |
| DE | 112011100450 T5 | | 4/2013 | |
| DE | 102014204561 A1 | | 9/2014 | |
| DE | 102017117884 A1 | | 2/2018 | |
| DE | 102016123735 A1 | | 6/2018 | |
| DE | 102019101646 A1 * | | 7/2020 | B60T 8/409 |
| DE | 102021102058 A1 * | | 8/2022 | B60T 8/4086 |
| EP | 3213168 B1 | | 7/2018 | |
| FR | 2871114 A1 | | 12/2005 | |
| WO | WO2010081840 A1 | | 7/2010 | |

OTHER PUBLICATIONS

International Search Report dated Dec. 15, 2022 in corresponding application PCT/EP2022/074565.

* cited by examiner

PEDAL EMULATOR FOR A VEHICLE

This nonprovisional application is a continuation of International Application No. PCT/EP2022/074590, which was filed on Sep. 5, 2022, and which claims priority to German Patent Application No. 10 2021 124 880.9 which was filed in Germany on Sep. 27, 2021, and which are both herein incorporated by reference.

BACKGROUND OF THE INVENTION

Field of the Invention

The invention relates to a pedal emulator for a vehicle, a brake-by-wire braking system, and a vehicle.

Description of the Background Art

Due to the increasing electrification in the vehicle market as well as more stringent emission requirements, it is necessary to consider new options for the generation of braking action. Present braking systems are trending toward boosting the braking action servo-electrically instead of using a vacuum-based technology. However, the control on the braking action is still purely mechanical.

The next objective in the development step is to completely decouple the driver's braking command from the braking action (so-called "brake-by-wire"), which is already the case for accelerator pedals. In order for the haptics to continue to remain comparable to conventional braking systems, mechanical simulation of the force-displacement characteristic is necessary. In comparison to the accelerator pedal, there is a nonlinear relationship between the pedal travel and the pedal force. This generally involves a progressive increase in force over the pedal travel.

The current prior art primarily constitutes hydraulically based braking systems in which the foot force on the pedal is transferred to the master brake cylinder via a brake booster (hydraulically or by vacuum). A pedal emulator is known from DE 10 2019 101 646 A1, which corresponds to US 2022/0089135, which is incorporated herein by reference. By use of a force sensor system situated in the movable pedal, and the mechanical decoupling of the actuation of the brake (brake-by-wire), the vehicle interior may be closed (no opening in the so-called "firewall") and external noise may be reduced. Furthermore, components of the brake may be freely placed in the vehicle. Various requirements may be met via the mechanical simulation of the force-displacement characteristic. In addition to the mapping of the conventional braking systems, standardization and individualization via various OEMs and vehicle platforms are possible.

SUMMARY OF THE INVENTION

It is therefore an object of the present invention to provide a pedal emulator for a vehicle, via which good haptics in the pedal actuation and a compact, structurally simple design of the pedal emulator is made possible.

The above object is achieved by a pedal emulator, a brake-by-wire braking system, and a vehicle. Features and details that are described in conjunction with the pedal emulator according to the invention also apply in conjunction with the brake-by-wire braking system according to the invention and to the vehicle according to the invention, and vice versa in each case, so that with regard to the disclosure, mutual reference is or may always be made to the individual aspects of the invention.

According to a first aspect of the invention, the object is achieved by a pedal emulator for a vehicle, having a rotational axis, a pedal lever that is rotatable about the rotational axis, and a force generation unit for exerting a counterforce on the pedal lever by at least one coupling element of the force generation unit that is mechanically coupled to the pedal lever, the counterforce acting oppositely with respect to an actuating force exerted on the pedal lever, and the force generation unit being designed in such a way that a profile of the counterforce along a pedal travel of the pedal lever in a pedal travel-counterforce diagram is designed as a nonlinear profile, the force generation unit having a restoring element which at one end is mechanically coupled to the rotational axis, and at the other end is mechanically coupled to the coupling element via a reset carrier.

Due to the nonlinear profile, generated by the force generation unit, of the counterforce along the pedal travel of the pedal lever or, in other words, along a rotation of the pedal travel about the rotational axis, which may be depicted in the mentioned pedal travel-counterforce diagram, the haptics of a conventional pedal (as described at the outset with reference to a brake pedal) are emulated.

In the present case, the pedal travel-counterforce diagram can be formed by two different force paths that are connected to one another via the reset carrier. On the one hand, a pedal travel-counterforce travel between the pedal lever or the rotational axis and the restoring element is provided. On the other hand, a further pedal travel-counterforce travel between the pedal lever or the rotational axis and the reset carrier is provided via the coupling element. These two pedal travel-counterforce travels together form the desired nonlinear profile of the counterforce along the pedal travel.

In particular, a progressive profile may be provided as a nonlinear profile. Accordingly, the counterforce increases disproportionately with increasing pedal travel, i.e., with increasing actuation of the pedal lever by the driver.

The pedal emulator may in particular be a brake pedal emulator. In other words, the pedal emulator may be used in a brake pedal of a vehicle.

The restoring element can have two mechanical coupling points with respect to the pedal lever. At one end of the restoring element this is provided by the mechanical coupling to the rotational axis. This may take place in such a way that the restoring element is directly connected to the pedal lever. In an example, explained in greater detail below, with an intermediate lever at the rotational axis, this may also take place via a mechanical connection of the restoring element to the intermediate lever. The mechanical coupling of the restoring element to the rotational axis may thus take place via a lever at the rotational axis, in particular the pedal lever or the intermediate lever.

At the other end of the restoring element, this takes place via a corresponding mechanical coupling to a reset carrier, which in turn is coupled to the coupling element.

The coupling element may be designed, for example, as a coupling rod or an extension of the above-mentioned intermediate lever, as explained in greater detail below.

The restoring element may be formed by one or more return springs. Correspondingly, the reset carrier may be designed as a spring carrier. The reset carrier may be designed, for example, as a simple spring, as a spring packet, or as a cascaded spring system that is connected in series and/or in parallel. It is possible to use different types of springs for the at least one return spring, for example to use a compression spring and/or coil spring.

The coupling element at one end may have a first coupling element axis that is mechanically coupled to the rotational axis, and at the other end may have a second coupling element axis that is mechanically coupled to the spring carrier. Alternatively, a stationary coupling element, for example an extension of the intermediate lever in the direction toward the reset carrier, may be provided.

The reset carrier may have a reset carrier axis about which the reset carrier may be designed to be rotatable. In this way the reset carrier, upon actuation of the pedal lever and conveying of the actuation of the pedal lever via the coupling element to the reset carrier, may rotate with the compression and elongation of the restoring element in such a way that an essentially straight extension of the restoring element is maintained. For a return spring as a restoring element, this may also be referred to as a spring carrier axis. Due to the rotatability of the spring carrier axis, the essentially straight extension of the return spring may be maintained here when the pedal lever is actuated.

The reset carrier axis may be designed to provide hysteresis. This may take place, for example, by forming a bearing of the reset carrier axis with a corresponding bearing force, and/or of the reset carrier axis with a corresponding friction diameter. "Hysteresis" is understood to mean a different force-displacement characteristic upon actuation and upon release of the pedal lever. The stated bearing force and/or the friction diameter may be dimensioned so that they counteract the generated counterforce with a smaller force than the counterforce, and thus prevent the pedal lever from snapping back upon release by the driver.

The pedal emulator, in particular the force generation unit, may thus have a transmission lever between the coupling element and the reset carrier axis. In other words, a transmission lever may be formed or may act between the coupling element and the reset carrier axis.

In addition, the pedal emulator, in particular the force generation unit, may have a reset lever between the reset carrier axis and the restoring element. In other words, a reset lever may be formed or may act between the reset carrier axis and the restoring element.

It may be provided that the pedal emulator, in particular the force generation unit, is configured in such a way that the transmission lever becomes smaller with increasing pedal travel, and the reset lever becomes larger with increasing pedal travel. In other words, a transmission ratio that is variable with increasing pedal travel is provided between the transmission lever and the reset lever. An increasingly progressive profile of the pedal travel-counterforce diagram may thus be provided via the pedal travel or the rotation of the pedal lever about the rotational axis.

The pedal emulator may have a force application lever between the rotational axis and the coupling element, in particular a first or second coupling element axis of the coupling element as described above. The force application lever may be translated via at least one further lever of the pedal emulator or of the force generation unit, in particular the above-described transmission lever and the reset lever. A leverage ratio may thus be set between the force application lever and the transmission lever, via which a speed step-up between the pedal rotation and the rotation of the reset carrier takes place. In relation to the pedal travel, this involves a speed step-up and thus an increasingly progressive pedal travel-counterforce profile.

Accordingly, the above-mentioned further pedal travel-counterforce travel between the pedal lever or the rotational axis and the reset carrier via the coupling element by suitable provision of levers and their transmission ratios may provide the increasingly progressive pedal travel-counterforce profile along with or in addition to the restoring element itself.

The restoring element may have an in particular rotatable seat via which the restoring element is mechanically coupled to the reset carrier. With a design of the restoring element as a return spring, the seat may also be referred to as a spring seat. In a design with a rotatable reset carrier, the rotatability of the seat allows the seat to rotate together with the reset carrier in order to leave the longitudinal extension of the restoring element essentially straight.

The force generation unit may have an intermediate lever that is rotatable about the rotational axis and that is mechanically coupled to the coupling element. In this case the restoring element may be mechanically coupled to, in particular supported on, the intermediate lever. The coupling element may be situated at the intermediate lever, in particular integrally formed thereon, or may be fastened thereto as a separate part, in particular a coupling rod.

It is very particularly possible for the force generation unit to have an intermediate spring element via which the pedal lever is mechanically coupled to the intermediate lever. The intermediate spring element may be designed as an intermediate spring in the form of, for example, a compression spring, in particular a coil spring, disk spring, leaf spring, or the like. The intermediate spring element is thus connected in series in front of the restoring element, and may also be referred to as a second spring system of the force generation unit which is situated or connected in front of a first spring system of the force generation unit, the first spring system being understood to mean the system comprising the restoring element with its mechanical coupling to the rotational axis and its coupling to the coupling element via the reset carrier. Due to the targeted deformation of the intermediate spring element, via a path detection of the deflection of the intermediate spring element a conclusion may be drawn concerning the force present at the pedal. In addition, it is possible to use the second spring system as part of the pedal hardening or progression of the pedal travel-counterforce profile, in that the first spring system has, for example, a stop at the intermediate lever or some other type of reduction or blockage of the change in pedal travel at the first spring system.

It is also possible for the reset carrier and the coupling element to be mechanically decouplable from one another. Thus, the reset carrier and the coupling element, in particular the above-mentioned second coupling element axis, may be coupleable and decouplable to/from one another in a form-fit manner or upon contact with one another. For example, the reset carrier may be provided with a socket, and the coupling element may be provided with a joint for this socket. The reset carrier and the coupling element may be mechanically decoupled from one another by releasing the form-fit connection or the contact between the two. A safety mechanism which may also be referred to as "fail-safe" may thus be provided which brings about mechanical decoupling of the connection of the two in the event of increased hysteresis, a blockage of the reset carrier, or other mechanical errors.

Correspondingly, it may be provided that the reset carrier and the coupling element are designed to be mechanically decoupled from one another via the counterforce of the force generation unit. The counterforce, which is applied in particular by the restoring element, ensures, for example in the event of the mentioned blockage of the reset carrier, that the coupling element and thus the pedal lever may be reset and do not remain in the blocked position with the reset carrier, which would make further actuation of the pedal impossible. Instead, it is still possible for the pedal or the pedal lever to be actuatable via the restoring element, even if further pedal travel-counterforce travel via the reset carrier is not available, provided that the reset carrier is blocked, for example. Nevertheless, when the pedal lever is actuated, the reset carrier and the coupling element once again come into contact with one another in order to recouple when the problem, such as the blockage, has resolved itself or has been resolved. In this regard, it may also be stated that the reset carrier and the coupling element are once again mechanically coupleable to one another.

For resetting the pedal lever in the event of a defect in the restoring element, for example a spring fracture in a return spring as a restoring element, it is advantageous when the return spring and optionally the intermediate spring are designed as a spring packet made up of at least two springs arranged in parallel.

It is also possible for the pedal emulator to include a housing that has an opening for the pedal lever, and in which the force generation unit is situated. The pedal lever may be correspondingly rotated within the opening. The rotational axis may be formed within the housing.

According to a second aspect of the invention, the object stated at the outset is achieved by a brake-by-wire braking system having a pedal emulator according to the first aspect of the invention, and a brake, the brake-by-wire braking system including a control unit that is connected to a sensor of the pedal emulator, and the control unit being configured to control the brake according to measured values of the sensor.

Various sensors, also different sensors in combination, may be used. For example, it is possible to use one sensor for detecting a rotational angle of the pedal lever about the rotational axis, and/or to use one sensor for detecting the displacement or spring excursion of the restoring element and/or of the intermediate spring element.

The control unit may then appropriately control the brake by use of a suitable actuator, corresponding to the measured values of the sensor or the combination of sensors, and thus corresponding to the intent of the driver.

Lastly, according to a third aspect of the invention the object stated at the outset is achieved by a vehicle having a brake-by-wire braking system according to the second aspect of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
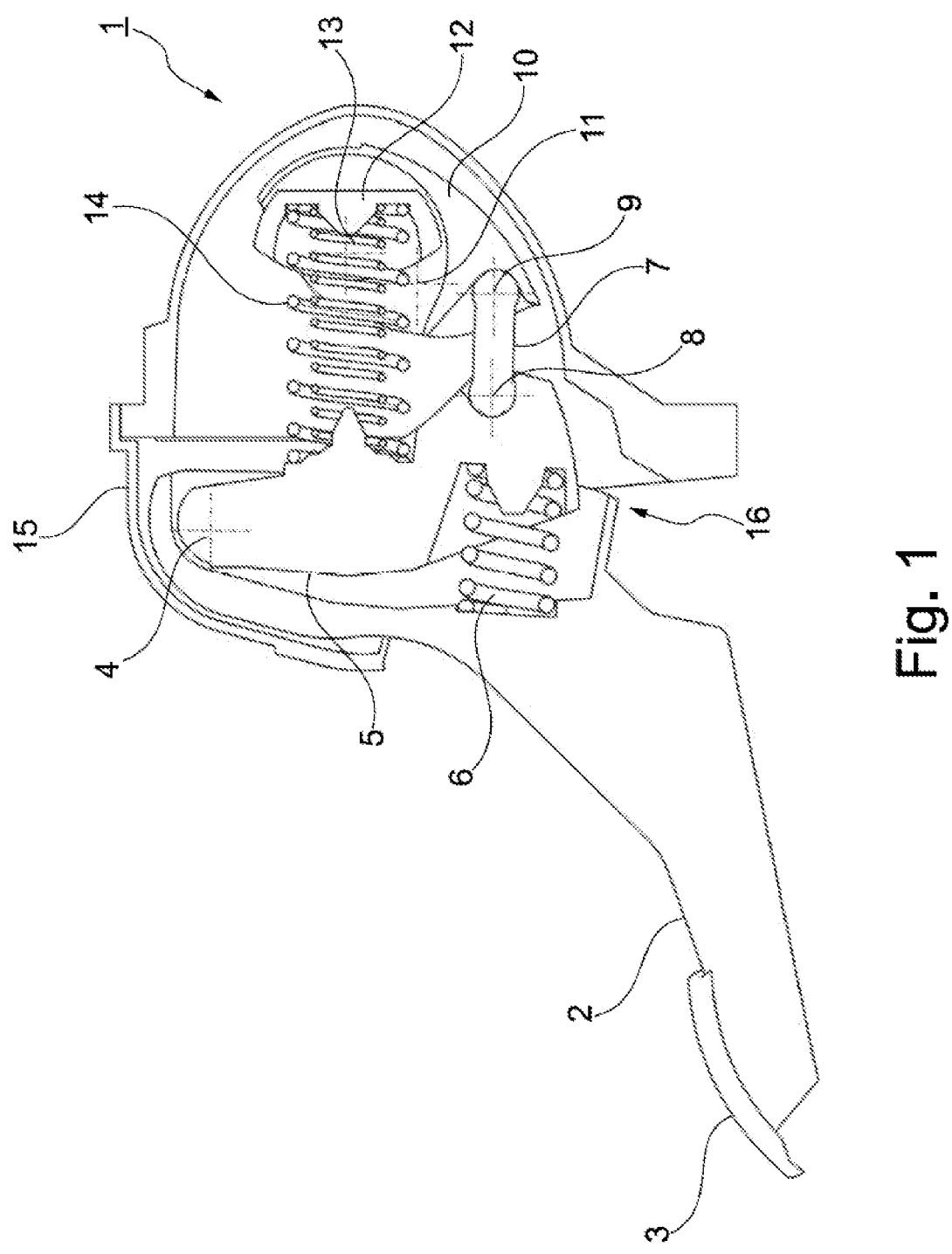
FIG. 1 shows a cross-sectional view of a pedal emulator according to an example of the invention.

FIG. 1 shows a pedal emulator 1 for a vehicle 30 (see FIG. 9, where the vehicle is illustrated only in a strictly schematic manner), the pedal emulator 1 being designed according to an example.

The pedal emulator 1 has a rotational axis 4 and a pedal lever 2, which is rotatable about the rotational axis 4, with an actuation surface 3 that is actuatable by the foot of the driver of the vehicle 30 in order to rotate the pedal lever 2 with respect to the rotational axis 4.

The pedal emulator 1 also has a force generation unit (not denoted) for exerting a counterforce on the pedal lever 1 via a coupling element 7 of the force generation unit that is mechanically coupled to the pedal lever 2. In the present example, the coupling element 7 is designed as a coupling rod 7 having a first coupling element axis 8 and a second coupling element axis 9, but may alternatively have a different design, for example the example explained below with reference to FIGS. 7 and 8.

The generated counterforce acts oppositely with respect to the actuating force exerted on the pedal lever 2 or the actuation surface 3 during the actuation by the driver. The force generation unit is designed in such a way that a profile of the counterforce along a pedal travel of the pedal lever 2 in a pedal travel-counterforce diagram (not shown) is designed as a progressive profile.

In addition to the coupling element 7, the force generation unit has a restoring element 14, which in the present case is designed as a return spring by way of example. The restoring element 14 at one end is mechanically coupled to the rotational axis 4, and at the other end is mechanically coupled to the coupling element 7 via a reset carrier 10, in the present case in the form of a spring carrier.

The restoring element 14 at one end is mechanically coupled to or supported on an intermediate lever 5, which likewise is rotatable about the rotational axis 4. Alternatively, the intermediate lever 5 may be dispensed with and the restoring element 14 may be directly supported on the pedal lever 2, as shown by the example of the pedal emulator according to FIG. 6.

The reset carrier 10 is designed with a reset carrier axis 11 about which the reset carrier is rotatable. The reset carrier axis 11 is suitably designed with a friction diameter and/or a bearing force for providing hysteresis when the pedal lever 2 is actuated.

FIG. 1 also shows that the restoring element 14 has a seat 12 or spring seat which is likewise rotatable, and via which the restoring element 14 is mechanically coupled to the reset carrier 10.

In addition, the pedal emulator 1 has a housing 15 in which the force generation unit together with its components is situated. The housing 15 has an opening 16 through which the pedal lever 2 extends, and within which the pedal lever may be freely rotated about the rotational axis 4.

The example of the pedal emulator 1 from FIG. 1, in addition to the intermediate lever 5, has an intermediate spring element 6 which in the present case is designed as an intermediate spring by way of example, and which at one end is mechanically coupled to the pedal lever 2, and at the other end, to the intermediate lever 5.

The intermediate spring element 6 is thus connected in series in front of the restoring element 14, and may also be referred to as a second spring system of the force generation unit, which is situated or connected in front of a first spring system of the force generation unit, the first spring system being understood to mean the system comprising the restoring element 14 with its mechanical coupling to the rotational axis 4 and its coupling to the coupling element 7 via the reset carrier 10.

Figure 6:
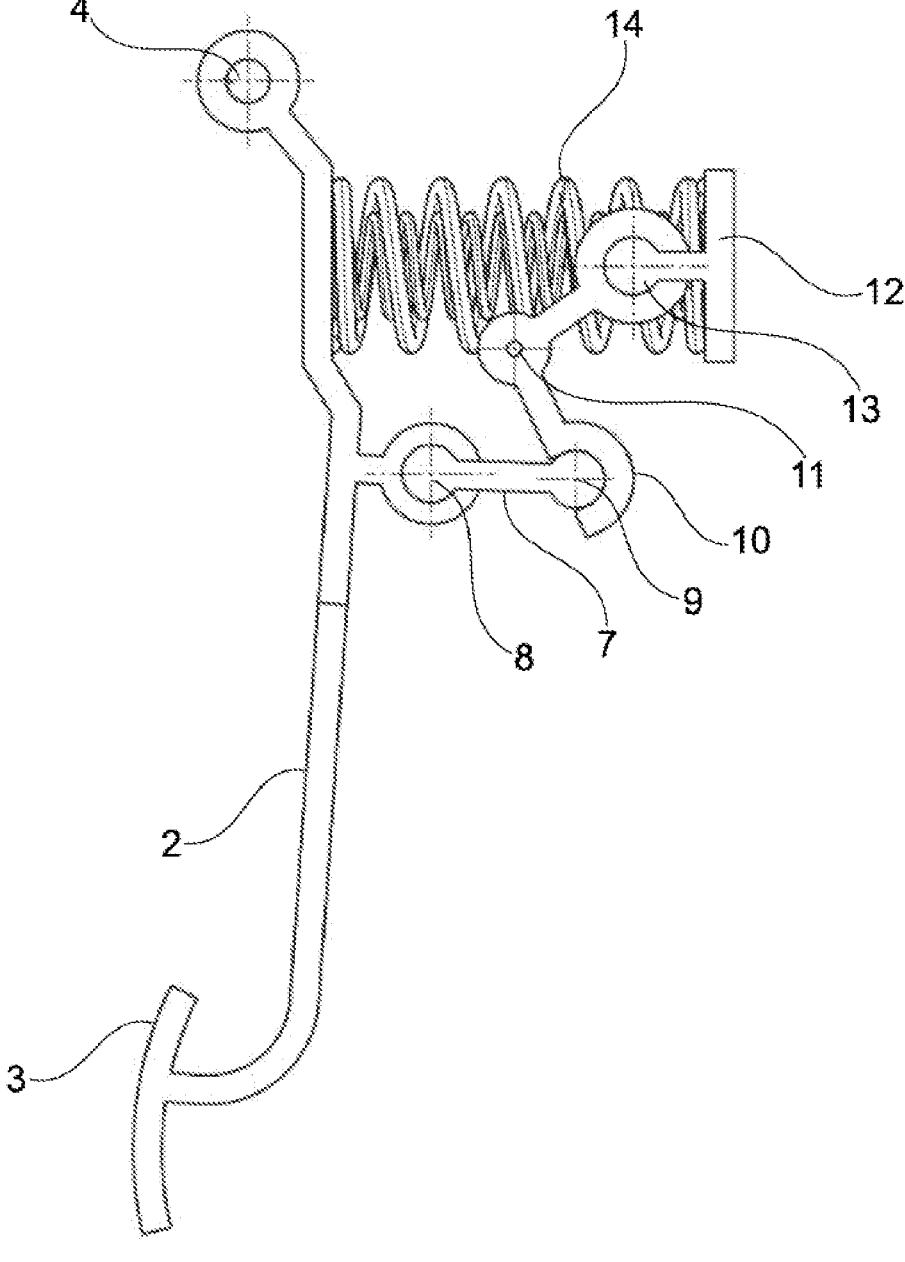
FIG. 6 shows a schematic diagram of a pedal emulator according to an example of the invention.

However, in the example in FIG. 6, a pedal emulator 1 is shown without such a second spring system or without an intermediate lever 5 and intermediate spring element 6.

Figure 2:
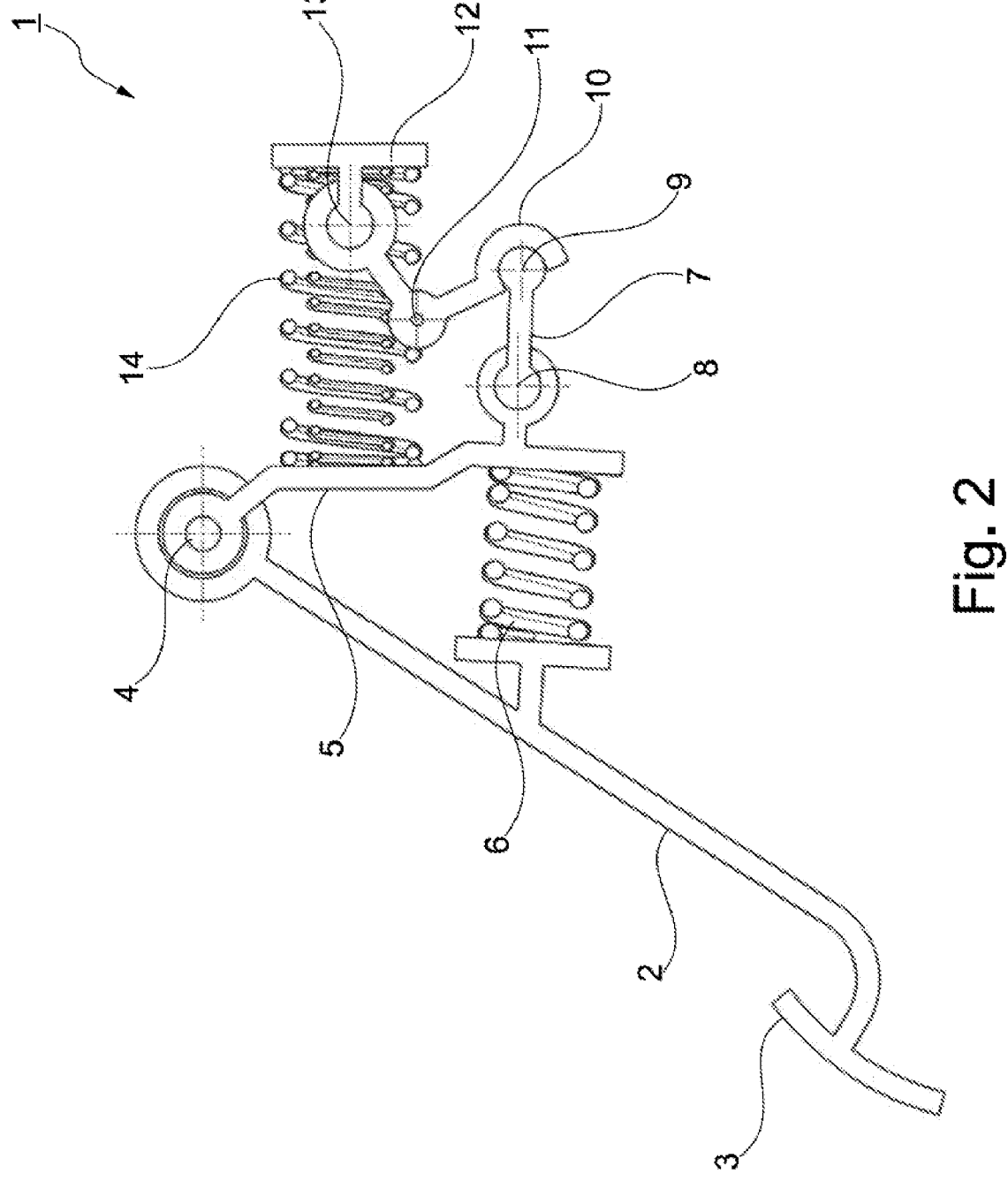
FIG. 2 shows a schematic diagram of the pedal emulator from FIG. 1 in a coupled state.

FIG. 2 shows the pedal emulator 1 from FIG. 1 in a schematic diagram. It is particularly clearly apparent that the reset carrier 10 and the coupling element 7 are mechanically coupled to one another via the coupling element axis 9; i.e., a coupled state is present.

In this example of the pedal emulator 1, the reset carrier 10 and the coupling element 7 or its coupling element axis 9 have a form-fit design relative to one another. For example, the reset carrier 10 may be provided with a socket, and the coupling element 7 may be provided with a joint for this socket, as is discernible in FIG. 2.

Figure 7:
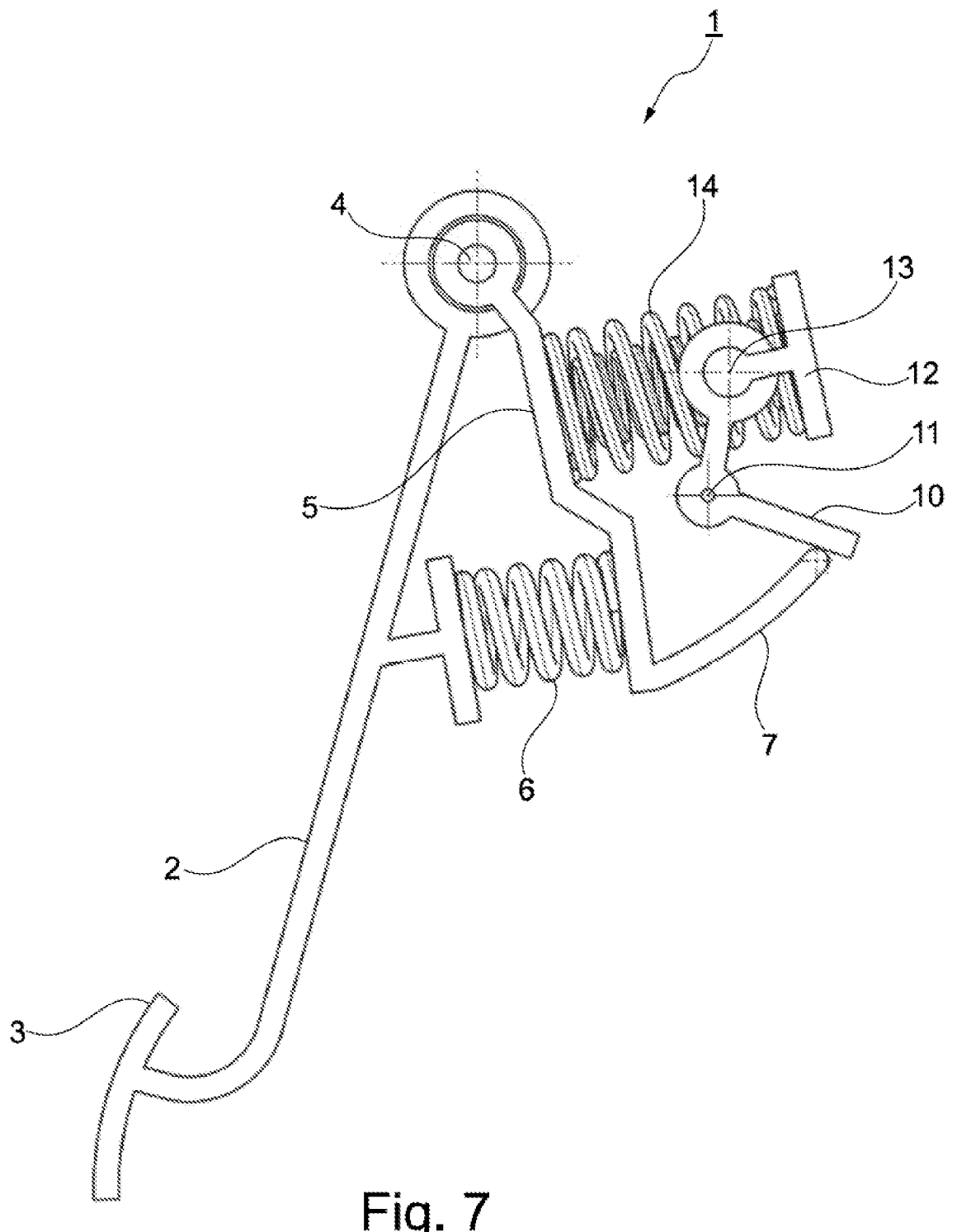
FIG. 7 shows a schematic diagram of a pedal emulator according to an example of the invention in a coupled state.
Figure 8:
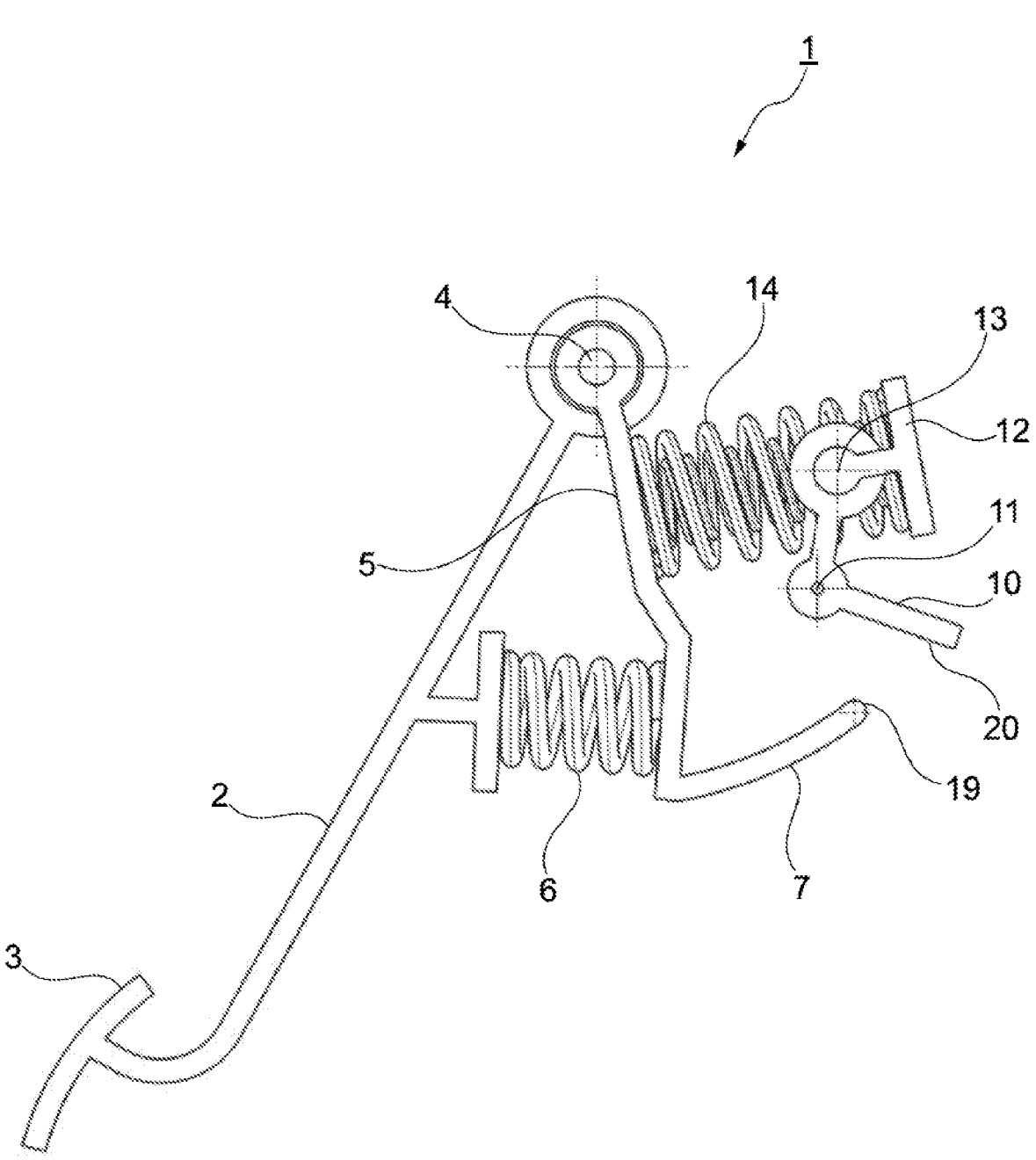
FIG. 8 shows the pedal emulator according to the schematic diagram from FIG. 7 in a decoupled state.

Alternatively, however, some other type of design of the reset carrier 10 and the coupling element 7 relative to one another is possible, for example contact with one another, as shown in the example of the pedal emulator 1 in FIGS. 7 and 8.

Figure 3:
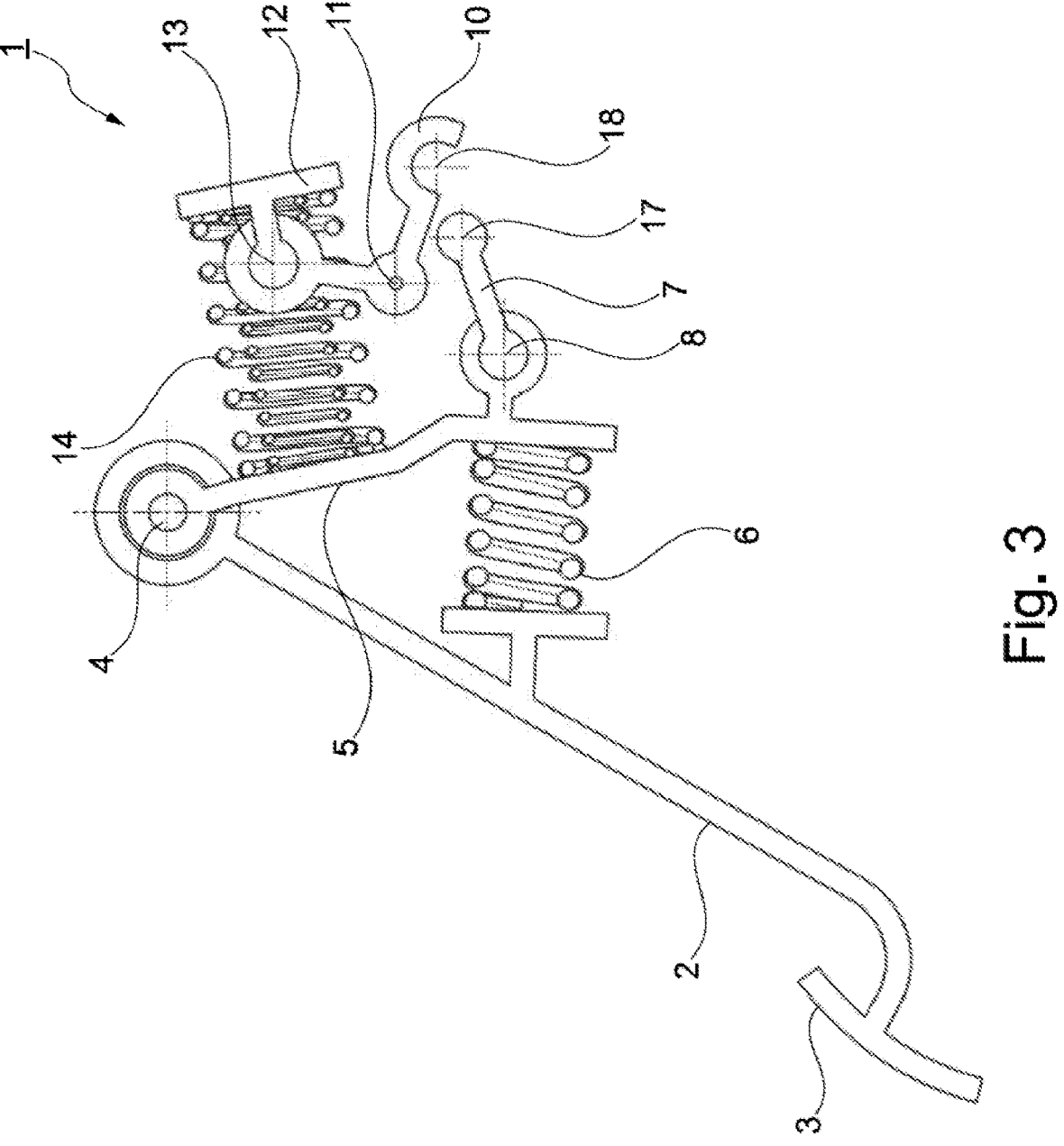
FIG. 3 shows the pedal emulator according to the schematic diagram from FIG. 2 in a decoupled state.

The reset carrier 10 and the coupling element 7 may be mechanically decoupled from one another by releasing the form-fit connection or the contact between the two, as shown in FIG. 3. In this decoupled state, the reset carrier 10 lifts off from the coupling element 7. A safety mechanism which may also be referred as "fail-safe" is thus provided which brings about mechanical decoupling of the connection of the two in the event of increased hysteresis, a blockage of the reset carrier 10, or other mechanical errors.

The reset carrier 10 and the coupling element 7 are very particularly designed to be mechanically decoupled from one another via the counterforce of the force generation unit. In the event of the mentioned blockage of the reset carrier 10, for example, the counterforce applied in particular by the restoring element 14 ensures that the coupling element 7 and thus the pedal lever 2 may be reset and do not remain in the blocked position with the reset carrier 10, which would make further actuation of the pedal lever 2 impossible. Instead, it is still possible for the pedal or the pedal lever 2 to be actuatable via the restoring element 14, even if the further pedal travel-counterforce travel via the reset carrier 10 is not available, provided that the reset carrier is blocked, for example. Nevertheless, when the pedal lever 2 is actuated, the reset carrier 10 and the coupling element 7 once again come into contact with one another to recouple when the problem, such as the blockage, has resolved itself or has been resolved.

Figure 4:
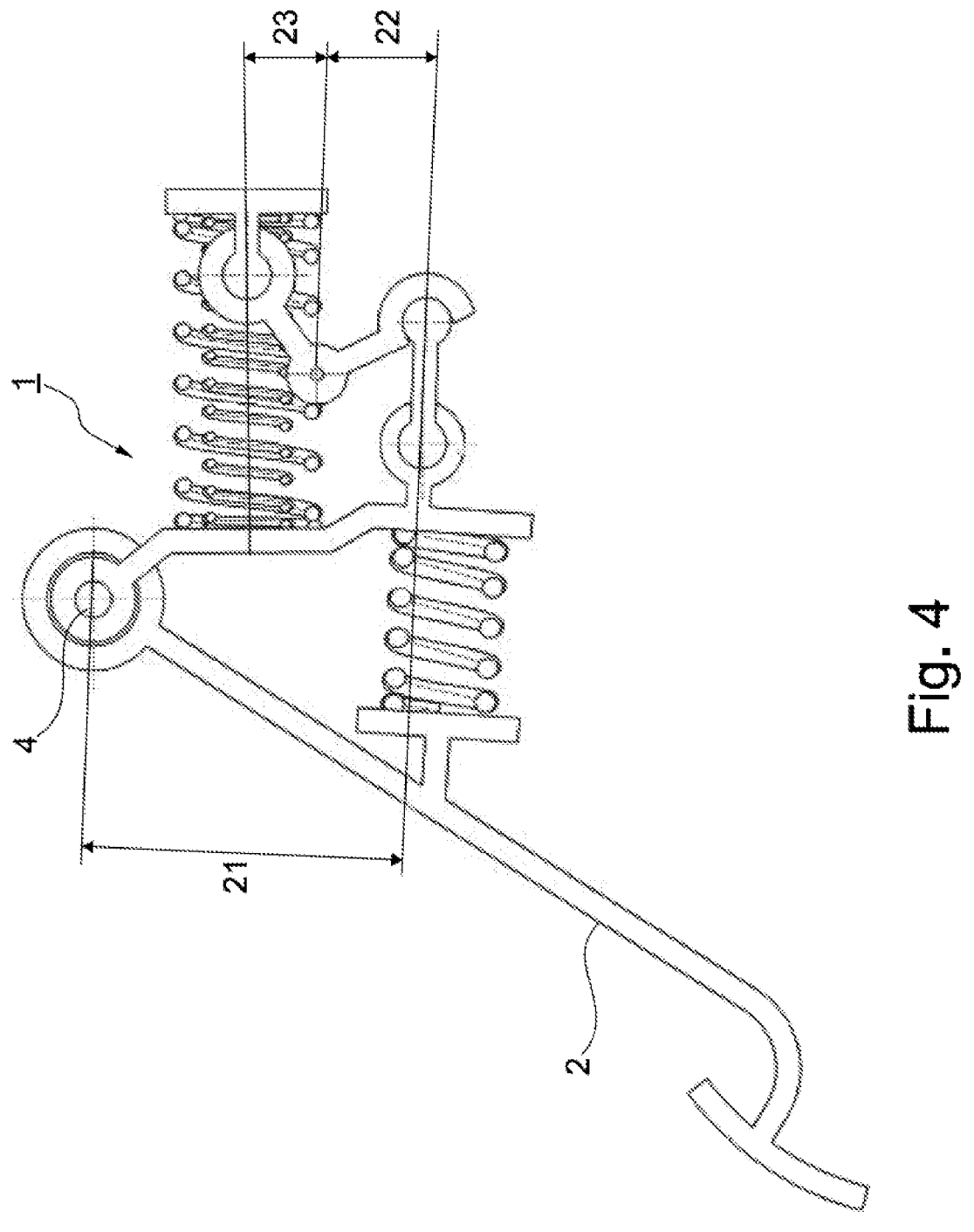
FIG. 4 shows the pedal emulator from FIG. 2 with depicted levers.
Figure 5:
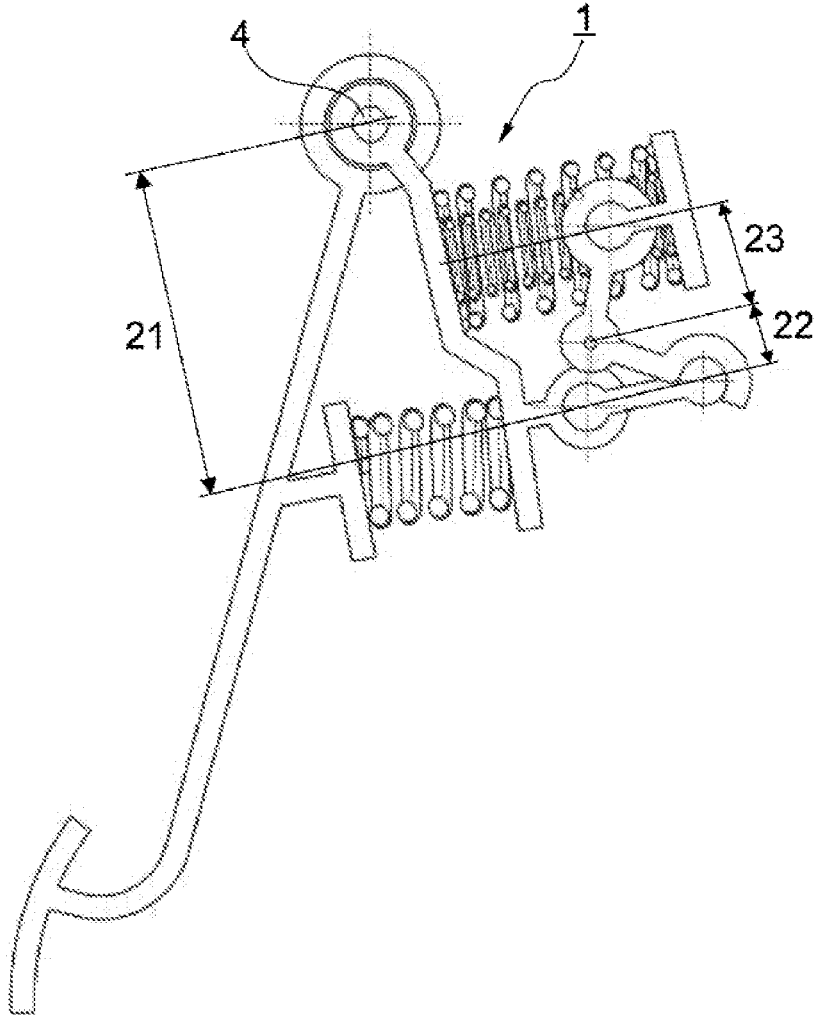
FIG. 5 shows the pedal emulator from FIG. 3 with depicted levers.

FIGS. 4 and 5 show that the pedal emulator 1 is also provided with multiple levers 21, 22, 23. Thus, the pedal emulator 1 has a lever, referred to herein as a force application lever 21, between the rotational axis 4 and the coupling element 7. In addition, the pedal emulator 1 has a lever, referred to herein as a transmission lever 22, between the coupling element 7 and the reset carrier axis 11. Lastly, the pedal emulator 1 also has a lever, referred to herein as a reset lever 23, between the reset carrier axis 11 and the restoring element 14 or a center axis thereof.

FIG. 4 shows the pedal emulator 1 with the levers 21, 22, 23 when the pedal lever 2 is not actuated, while FIG. 5 shows the pedal emulator 1 with the pedal lever 2 actuated or pushed through. As is apparent in a comparison of FIGS. 4 and 5, the leverage ratios of the levers 21, 22, 23 are configured in such a way that the transmission lever 22 becomes smaller with increasing pedal travel, and the reset lever 23 becomes larger with increasing pedal travel or actuation of the pedal lever 2. An increasingly progressive profile of the pedal travel-counterforce diagram may thus be provided via the pedal travel or the rotation of the pedal lever 2 about the rotational axis 4.

FIGS. 6, 7, and 8 show the examples of a pedal emulator 1 explained above. The features of the different example may be combined with one another.

Figure 9:
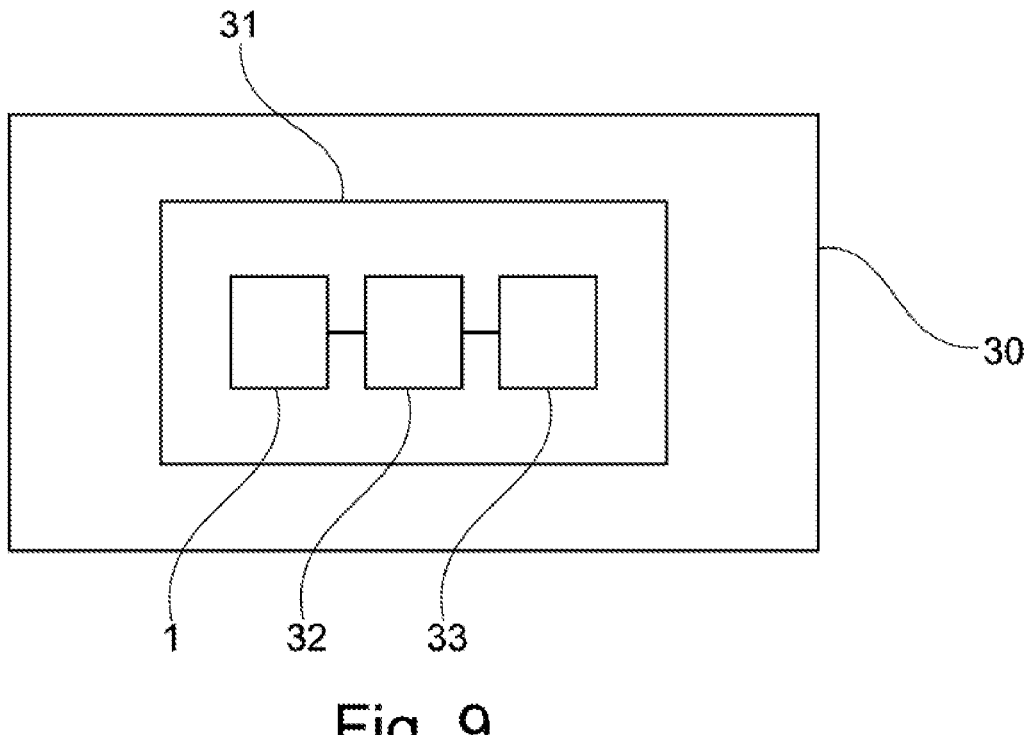
FIG. 9 shows a schematic view of a vehicle that includes a brake-by-wire braking system.

FIG. 9 shows a strictly schematic diagram of a vehicle 30, for example an automobile such as a passenger automobile. The vehicle 30 includes a brake-by-wire braking system 31 with a pedal emulator 1 according to the examples, and a brake 33. The brake-by-wire braking system also has a control unit that is connected to a sensor of the pedal emulator 1, the sensor being configured to determine the pedal travel of the pedal lever 2 or the rotation of the pedal lever 2 about the rotational axis 4. The control unit 32 controls the brake 33 according to measured values of the sensor.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pedal emulator for a vehicle, the pedal emulator comprising:

a rotational axis;

a pedal lever that is rotatable about the rotational axis; and a force generator to exert a counterforce on the pedal lever by at least one coupling element of the force generator that is mechanically coupled to the pedal lever, the counterforce acting oppositely with respect to an actuating force exerted on the pedal lever, and the force generator being designed such that a profile of the counterforce along a pedal travel of the pedal lever in a pedal travel-counterforce diagram is a nonlinear profile, wherein the force generator has a restoring element, a first end of the restoring element being mechanically coupled to the rotational axis and a second end of the restoring element being mechanically coupled to the coupling element via a reset carrier, wherein the first end of the restoring element is mechanically coupled to the rotational axis by being directly supported on the pedal lever or by being directly supported on an intermediate lever, the intermediate lever having a first end that is mounted directly at the rotational axis so that the intermediate lever rotates about the rotational axis, and wherein the second end of the restoring element is directly supported on a spring seat of the reset carrier, and the reset carrier is directly coupled to a first end of the coupling element so that the reset carrier directly contacts the first end of the coupling element.

2. The pedal emulator according to claim 1, wherein the reset carrier has a reset carrier axis about which the reset carrier is rotatable.

3. The pedal emulator according to claim 2, wherein the reset carrier axis is designed to provide hysteresis.

4. The pedal emulator according to claim 2, wherein a transmission lever is formed between the coupling element and the reset carrier axis.

5. The pedal emulator according to claim 4, wherein a reset lever is formed between the reset carrier axis and a center axis of the restoring element.

6. The pedal emulator according to claim 5, wherein the pedal emulator is configured such that the transmission lever becomes smaller with increasing pedal travel, and the reset lever becomes larger with increasing pedal travel.

7. The pedal emulator according to claim 1, wherein the pedal emulator has a force application lever between the rotational axis and the coupling element.

8. The pedal emulator according to claim 1, wherein the intermediate lever that is rotatable about the rotational axis is mechanically coupled to a second end of the coupling element.

9. The pedal emulator according to claim 8, wherein the force generator has an intermediate spring element via which the pedal lever is mechanically coupled to the intermediate lever.

10. The pedal emulator according to claim 1, wherein the reset carrier and the coupling element are mechanically decouplable from one another.

11. The pedal emulator according to claim 10, wherein the reset carrier and the coupling element are designed to be mechanically decoupled from one another via the counter-force of the force generator.

12. The pedal emulator according to claim 1, wherein the pedal emulator has a housing that has an opening for the pedal lever, and in which the force generator is situated.

13. A brake-by-wire braking system comprising:
a pedal emulator according to claim 1;
a brake; and
a control unit that is connected to a sensor of the pedal emulator, the control unit being configured to control the brake based on measured values of the sensor.

14. A vehicle comprising a brake-by-wire braking system according to claim 13.

15. The pedal emulator according to claim 1, wherein the restoring element is a spring.

16. The pedal emulator according to claim 9, wherein a first end of the intermediate spring element is directly supported on a first side of the intermediate lever and the first end of the restoring element is directly supported on a second side of the intermediate lever that opposes the first side.

* * * * *